United States Patent [19]

Gangi

[11] Patent Number: 5,241,902
[45] Date of Patent: Sep. 7, 1993

[54] MACHINE FOR CUTTING FRUIT INTO SECTIONS

[76] Inventor: Joseph C. Gangi, 78 Springhill Rd., North Andover, Mass. 01845

[21] Appl. No.: 1,817

[22] Filed: Jan. 8, 1993

[51] Int. Cl.⁵ .................... A23L 1/212; A23N 15/00; A23P 1/00; A47J 17/00
[52] U.S. Cl. ........................... 99/538; 83/402; 83/932; 99/537; 99/543; 99/545; 99/552
[58] Field of Search .................. 99/537, 538, 540–543, 99/544, 545, 547, 552, 553, 564, 590–593; 83/402, 444, 588, 932, 368, 425

[56] References Cited

U.S. PATENT DOCUMENTS

| | | | |
|---|---|---|---|
| 1,602,041 | 10/1926 | Neal | 83/444 |
| 1,825,628 | 9/1931 | Floyd et al. | 99/553 |
| 1,825,629 | 9/1931 | Floyd . | |
| 2,540,014 | 1/1951 | Smith . | |
| 2,560,229 | 7/1951 | Leavens | 83/588 |
| 2,703,122 | 3/1955 | Pease et al. | 99/553 |
| 2,750,976 | 6/1956 | Ganze | 99/553 |
| 3,099,302 | 7/1963 | Fain | 99/545 |
| 3,448,845 | 6/1969 | Belk et al. . | |
| 3,557,851 | 1/1971 | Tsutsumi . | |
| 3,830,151 | 8/1974 | Gerson . | |
| 3,896,243 | 7/1975 | Vadas . | |
| 3,948,161 | 4/1976 | Thorson | 99/564 |
| 4,082,024 | 4/1978 | Hodges et al. | 83/402 |
| 4,095,518 | 6/1978 | Jones . | |
| 4,111,112 | 9/1978 | Altman . | |
| 4,129,068 | 12/1978 | McKenzie . | |
| 4,436,025 | 3/1984 | Jones . | |
| 4,452,104 | 6/1984 | Altman . | |
| 4,453,458 | 6/1984 | Altman . | |
| 4,569,280 | 2/1986 | D'Ambro et al. . | |
| 4,938,111 | 7/1990 | Masse | 83/444 |
| 5,038,649 | 8/1991 | Hoaglin | 83/932 |
| 5,044,268 | 9/1991 | Lin . | |

Primary Examiner—Timothy F. Simone
Attorney, Agent, or Firm—Lorusso & Loud

[57] ABSTRACT

The apparatus of the present invention includes a plurality of blades, an inner guide having a longitudinal axis and an outer surface, an outer guide having a longitudinal axis and inner and outer surfaces, and a plurality of blade drive means for rotating each of the blades to cut the fruit into the desired shape. Both the inner and outer guides have a plurality of longitudinally extending apertures equal to the number of blades. The apertures are disposed in each guide's outer surface and each aperture in a guide's surface is circumferentially spaced from each other aperture in that guide surface. The apertures in the outer guide are also arranged such that they are aligned with the inner guide apertures. The inner guide is spaced from the outer guide inner surface to form a longitudinally extending annular aperture. The blades are disposed such that a portion of each blade extends through each outer guide aperture and into the annular aperture. The inner guide outer surface and the outer guide inner surface cooperate to guide both whole and broken fruit to the rotating blade portions in the annular aperture so the fruit can be cut into the desired shape. The outer guide also forms a barrier between the annular aperture and the blade drive means to avoid contamination of the fruit.

25 Claims, 6 Drawing Sheets

MACHINE FOR CUTTING FRUIT INTO SECTIONS

FIELD OF INVENTION

This invention relates to an apparatus for cutting fruit, such as citrus fruit, into sections or wedges and more particularly to an apparatus that cuts whole or broken fruit into sections with rotating blades.

BACKGROUND OF THE INVENTION

In the production of fruit salad, whole pieces of fruit are peeled, cored and cut to produce the desired product. For oranges, the desired end shape is a section or wedge without seeds and without the outer membrane or peel. Fruit wedges are desired because the fruit has a good appearance commercially. However, it is not uncommon to see orange slices, especially when the fruit is being cut by hand.

Because of the time and labor involved with cutting oranges into sections by hand, apparatuses and techniques were developed to automate or mechanize the fruit cutting or sectioning process, particularly for oranges. The techniques and associated apparatuses fall into two basic groupings; those where the fruit is first sectioned and then peeled and those where the fruit is first peeled and then sectioned.

An apparatus using the first technique is disclosed in U.S. Pat. No. 5,044,268, issued to Lin. In this apparatus, oranges are cut into wedges and then transported to the peeling device. The orange section is positioned in the peeling device such that a blade with a circular cross section can be forced into the orange section, separating the peel from the meat of the orange. In this apparatus, the means for sectioning was any one of the sectioning apparatuses known in the art. The presence of the peel on the fruit assures that the fruit remains intact and not broken before it is to be cut or sectioned.

There are disclosed in U.S. Pat. Nos. 1,825,628 and 1,825,629, both issued to Floyd et al, and U.S. Pat. No. 4,111,112, issued to Altman, apparatuses for sectioning the fruit after the peel or skin of the fruit has first been removed. These apparatuses use a plurality of spaced rotating blades to cut the fruit. Differences between the Floyd et al and Altman patents involve the manner in which the fruit is positioned for cutting and the cutting technique. Also in Floyd et al the fruit is cored and sectioned simultaneously, whereas in Altman the fruit has been cored before it is sectioned.

In the normal processing of oranges and other citrus fruit, approximately 5-10% of the fruit breaks into two or more segments. Breakage occurs from peeling the skin off and/or coring the fruit to remove the stem portion and the proximately located seeds. If the fruit is purchased in the peeled condition, the loading and unloading of the peeled fruit from the shipping containers, as well as the shipping itself, can cause the fruit to break into a plurality of segments.

In Floyd et al a whole piece of fruit is centered on a needle like projection so the fruit will be centered over the coring/cutting means. In Altman a cored and peeled piece of fruit slides down a spindle that centers the fruit for cutting. Neither of these apparatuses, however, can cut a piece of fruit that has been broken into a plurality of segments. Since these apparatuses cannot section broken fruit, the broken fruit must be separated out and either cut by hand or discarded. In either case, there are increased costs for hand cutting, for the purchase of additional fruit, and/or for the time delay.

The fruit product is typically not treated by heat (e.g., pasteurization) or treated using other techniques known for destroying bacteria that may be in food. Instead, the parts of the machines contacting the fruit are periodically washed down, usually more than once a day, to kill any bacteria (i.e., bacteria count below acceptable limits).

Care is also taken to assure that foreign matter does not intermingle with the fruit as it is being processed. If the fruit becomes contaminated with bacteria or foreign matter, the affected fruit (e.g., a run of fruit) must be discarded or destroyed. This results because as a practical matter there is no way to isolate and remove the contaminate from the processed fruit. As such, contamination of fruit is a significant concern because there is time lost and increased costs associated with the replacement of the destroyed fruit.

The Floyd et al and Altman apparatuses are constructed such that there is potential, to different degrees, for fruit contamination. Normal wear of drive belts and gears in these apparatuses can release foreign matter that can intermingle with the fruit as it is being cut. The periodic washing of the machine parts can also create conditions conducive to the production of foreign matter.

Therefore, it is an object of the present invention to provide an apparatus that can section broken citrus fruit, such as oranges.

Another object of the present invention is to provide an apparatus that significantly reduces the potential for contamination of fruit by foreign matter.

It is a further object of the present invention to provide an apparatus that can be easily adapted to section different sizes and types of fruit.

It is yet another object of the present invention to provide an apparatus that reduces the time, labor and costs required for sectioning fruit.

It is yet a further object of the present invention to provide an apparatus that can section fruit that is peeled or unpeeled and/or which is cored or uncored.

SUMMARY OF THE INVENTION

The apparatus of the present invention results from the realization that broken fruit can be sectioned by using cooperating and opposing surfaces to guide the fruit to and through a plurality of circumferential spaced rotating cutting blades. In addition, the fruit is being maintained in the orientation required to produce commercially desirable wedges. These cooperating surfaces can also be used to establish a physical barrier between the travel path of the fruit and external contamination from the environment and the non-blade parts of the machine.

More specifically an apparatus for cutting fruit into a desired shape, includes; a plurality of blades, an inner guide having a longitudinal axis and an outer surface, an outer guide having a longitudinal axis and inner and outer surfaces, and a plurality of blade drive means for rotating each blade to cut the fruit into the desired shape.

Both the inner and outer guides have a plurality of longitudinally extending apertures that equal the number of blades. The apertures are disposed in each guide's outer surface and each aperture in a guide's surface is circumferentially spaced from each other aperture in that surface. The apertures in the outer guide are also arranged such that the outer guide apertures are aligned with the inner guide apertures. The inner guide is also spaced from the outer guide inner surface to form a longitudinally extending annular aperture between the inner and outer guides.

The blades are disposed such that part of each blade extends through each outer guide aperture and into the annular aperture. Thus, when fruit is introduced into the annular aperture, the fruit is cut into the desired shape by the rotating blade portion extending into the annular aperture.

The inner guide outer surface and the outer guide inner surface cooperates to maintain the fruit in the desired orientation and to guide the fruit to the rotating blade portions in the annular aperture. The outer guide also forms a barrier between the annular aperture and the blade drive means to avoid contamination of the fruit.

In a preferred embodiment the blade portions may extend through an outer guide aperture, pass through the annular aperture and extend into a corresponding inner guide aperture. The inner and outer guides may be hollow right circular cylinders that have a common longitudinal axis. The outer guide inner surface may be optimally spaced from the inner guide's outer surface based on the size of the fruit to be cut.

The drive means may include an air or hydraulic motor means and belt drive means. The fruit cutting apparatus may further include means for transferring the cut fruit for further processing and in which the outer guide further includes means for directing the cut fruit from the rotating blades to the transferring means.

DESCRIPTION OF THE PREFERRED EMBODIMENT

Figure 1:
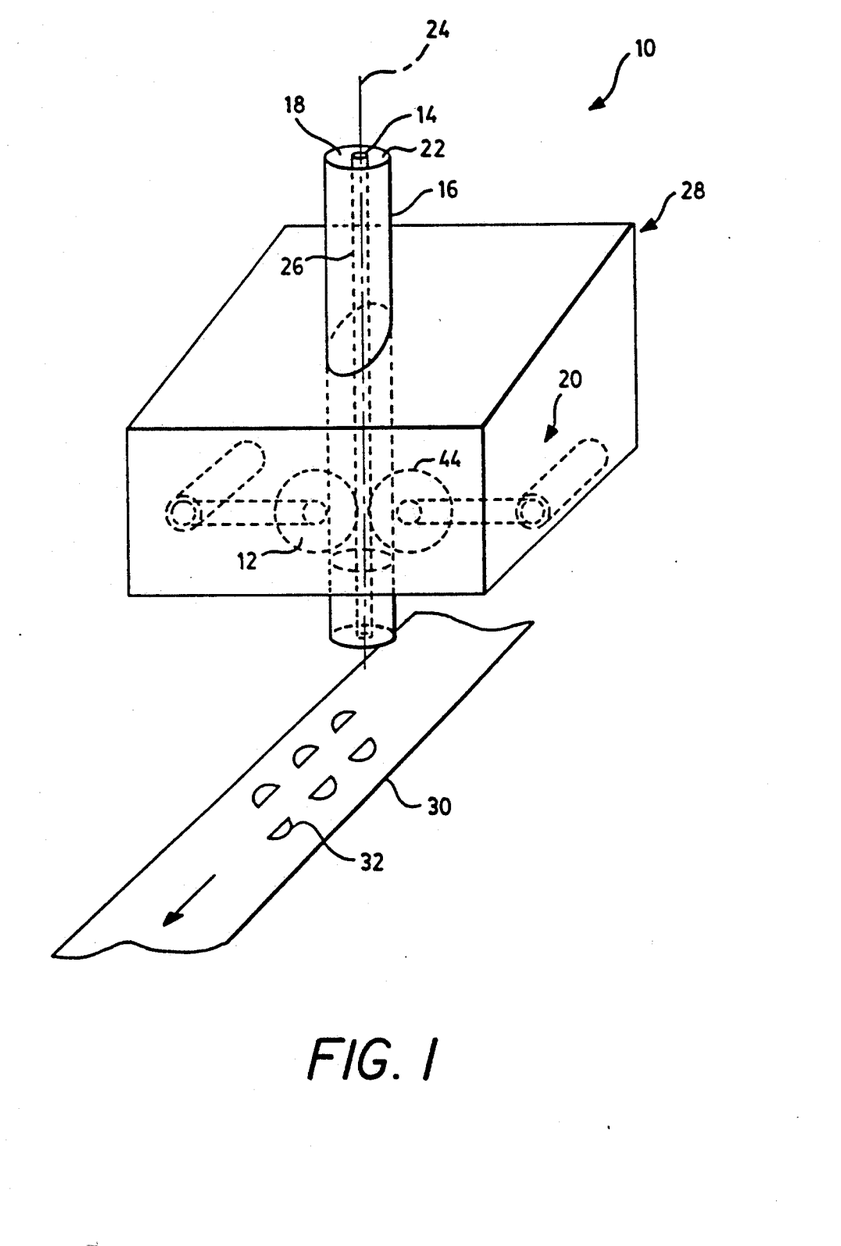
FIG. 1 is an axenometric view of the fruit sectioning apparatus of the present invention with some parts of it broken away.

There is shown on FIG. 1, an axenometric view of the fruit sectioning machine 10 of the present invention with two blades 12 and drive means 20. The other blades and drive means of the sectioning machine 10 have not been shown for purposes of clarity. Preferably, the sectioning machine 10 has eight blades 12 and drive means 20. The number of blades 12 is dependent upon the size of the wedges and the diameter of the fruit to be cut. For example, to section a larger diameter fruit, such as grapefruit, ten blades 12 and drive means 20 may be used. The drive means 20 is described in more detail in the discussion relating to FIG. 3.

The fruit sectioning machine 10 includes both an inner guide 14 and an outer guide 16 for guiding and maintaining the orientation of the fruit to be cut. The inner guide 14 and outer guide 16 are preferably right circular cylinders that share a common longitudinal axis 24. The guide material is preferably stainless steel. The guide material, however, may be any material known in the art that will not affect the fruit (e.g., the taste) being cut and can withstand the physical rigors of the service (e.g., periodic washing with a chlorine water solution for sterilization).

Figure 4:
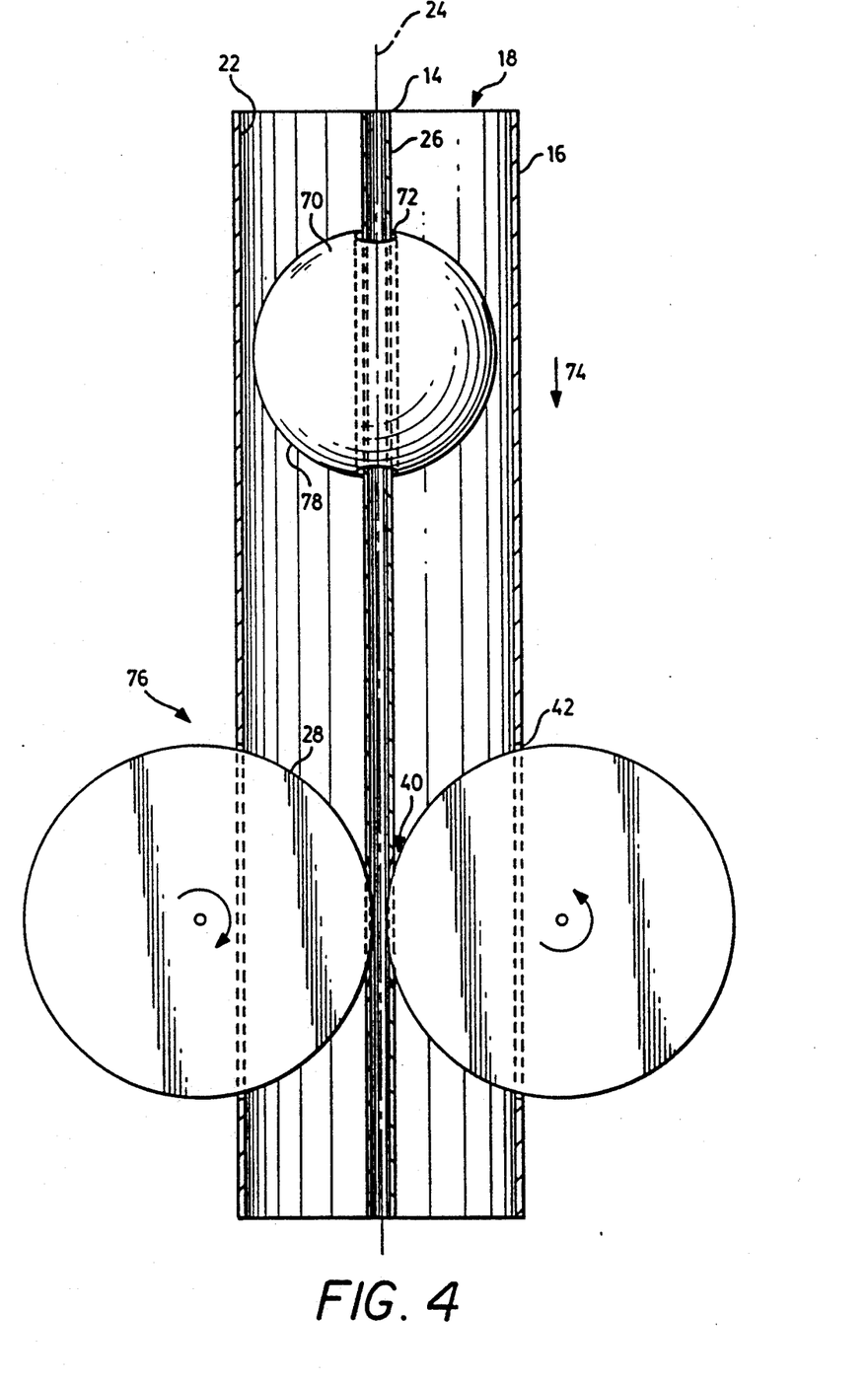
FIG. 4 is a fragmentary elevation view with some parts of the present invention broken away
Figure 6:
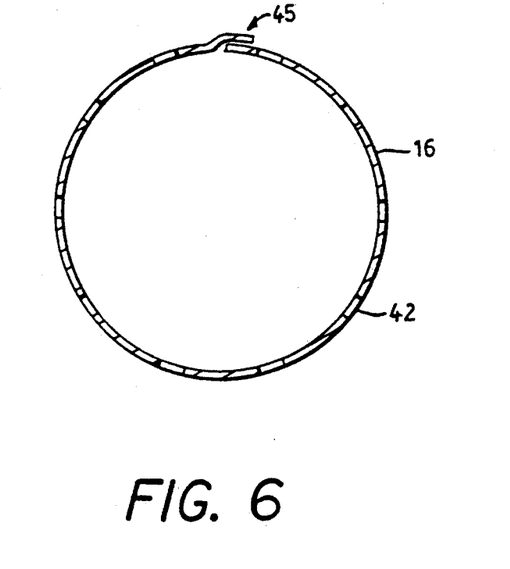
FIG. 6 is a plan view transverse to the outer guide of an adaptable outer guide.

The outer guide 16 is preferably a hollow cylinder, with an inner diameter established based on the graded size of the fruit to be cut. It should be recognized that fruit, such as oranges, is typically graded and sorted based on its outer diameter. Preferably, the established inner diameter is slightly greater than the outside diameter of the fruit. The outer guide 16 is provided with a plurality of longitudinally extending apertures 42 (as shown in FIG. 4), equal to the number of blades 12. The outer guide apertures 42 are disposed in the guide's outer surface and remote from both ends of the outer guide 16. Alternatively, as shown on FIG. 6, the outer guide 16 may include means 45 for adapting the outer guide so it cuts fruit of different sizes (e.g., overlapping portions of the outer guide).

The inner guide 14 preferably is a hollow cylinder, however, it may be a solid rod. The outer diameter of the inner guide 14 is preferably less than the diameter of the core hole 72 (as shown in FIG. 4) of a cored piece of fruit. It should be appreciated, however, that uncored fruit can be cut into sections by the present invention as described below regarding FIG. 4. The inner guide includes a plurality of longitudinally extending apertures 40 (as shown in FIG. 4), equal to the number of blades 12. The inner guide aperture 40 are disposed in the guide's outer surface and remote from both ends of the inner guide 14. The inner guide 14 is also spaced from the inner surface 22 of the outer guide 16 to form an annular opening 18 that extends along the guides' longitudinal axis 24.

To cut a whole piece of cored and peeled fruit into sections, a piece of fruit (not shown) is positioned so the fruit's core hole 72, as shown in FIG. 4, is aligned with the inner guide 14. In this way, when the fruit is released (e.g., by the machine operator), the inner guide 14 will guide the fruit as it falls and maintain the fruit in the desired orientation for cutting by the rotating blades 12.

However, the inner guide alone cannot guide a broken fruit segment and maintain it in the desired orientation. For a broken piece of fruit, the fruit segments are positioned so the cored middle portion of the segment is proximate the inner guide 14 and the fruit outer surface 78, as shown in FIG. 4, is proximate the outer guide inner surface 22. As such, when the fruit segments are released the inner guide outer surface 26 and the outer guide inner surface 22 cooperate to guide the falling fruit segments and maintain the segments in the desired orientation. The guide surfaces cooperate such that the broken fruit is sectioned by the rotating blades 12 as if it were a whole piece of fruit. If a whole piece of fruit breaks after it has been released, the guide surfaces will cooperate, as described above, to guide the fruit so it is cut into the desired shape.

The outer guide inner surface 22 also restrains the outward rotary motion of the whole or broken fruit as it is being cut by the rotating blades 12. Since the fruit is being cut from the bottom to the top, the bottom portion of the fruit will be cut through to the cored middle of the fruit while the top section is still together. Restraining the outward rotary motion imparted to the individual fruit sections or wedges assures that a fruit section will not be broken into pieces before the fruit has been cut from top to bottom, especially when the fruit has a soft spot. Fruit cut this way is also commercially acceptable since the cut surfaces have a knife like cut appearance.

In the sectioning machine 10 of the present invention a portion 28 of each blade 12 extends into the annular opening 18 formed by the inner and outer guides 14,16. When the blades 12 are rotated by the drive means 20, the blade portion 28 that extends into the annular opening 18, contacts and cuts the falling fruit.

The drive means 20, the blades 12, and the inner and outer guides 14,16 are mounted or affixed to a frame 28, which holds the various parts and components of the sectioning machine 10 in proper and secure alignment. The drive means 20 and the blades 12 are enclosed within the machine 10 by plates (not shown) affixed to the frame or other means well known in the art used to provide for operator safety.

The sectioning machine 10 of the present invention is compact. The compact design reduces operator fatiguing and back strain as well as minimizing building space requirements for the unit. Operator fatigue and back strain can lead to operator injuries as well as lost time delays. and reductions in productivity. Reducing the potential for injury, lost time delays and minimizing building space requirements also relates to reduction in costs and increases in productivity.

The sectioning machine 10 may further include a conveyer system 30 for transporting fruit sections 32 to other locations within the plant for further processing. The conveyer system may be any of a number of means, known in the art for transporting cut/sectioned fruits, which do not impart an undesirable taste; that do not contaminate the fruit; and/or that avoids bruising of the fruit. The hollow cylinder forming the outer guide 16 is longitudinally extended to guide the cut fruit sections 32 to the conveyer system 30.

Figure 2:
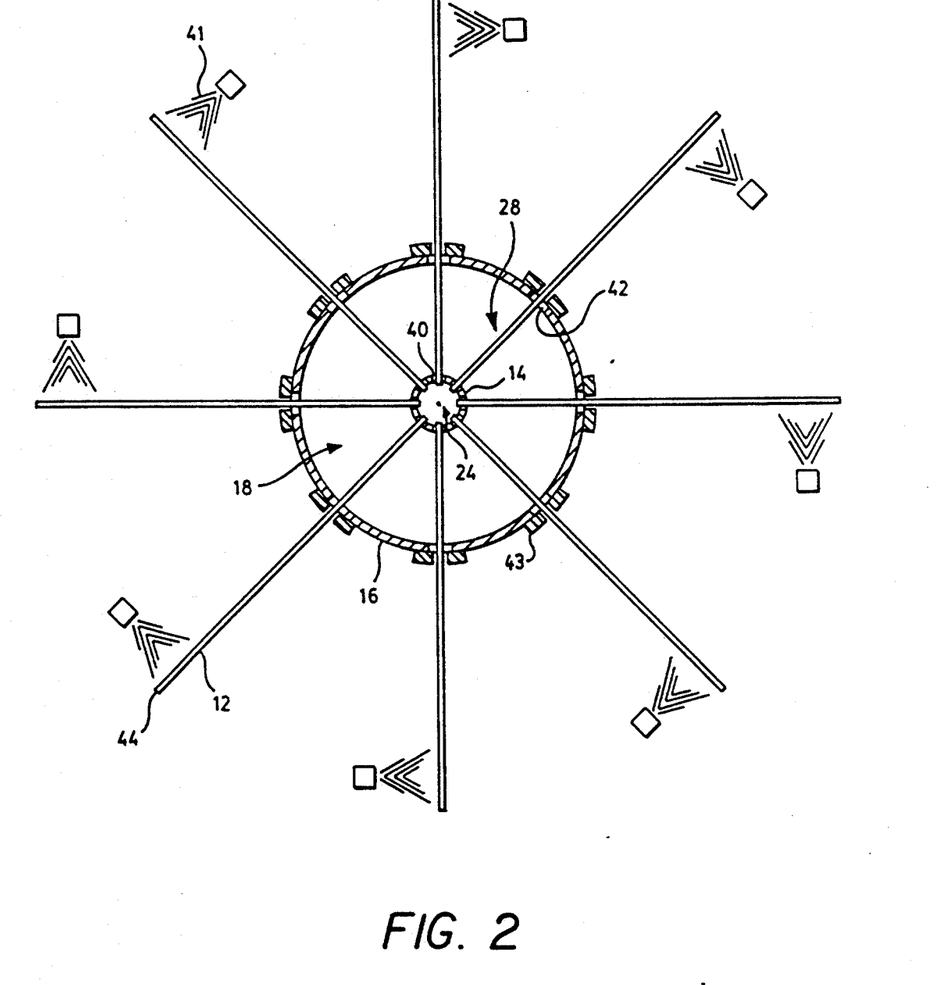
FIG. 2 is a plan view transverse to the inner and outer guides of an apparatus having eight blades.
Figure 5:
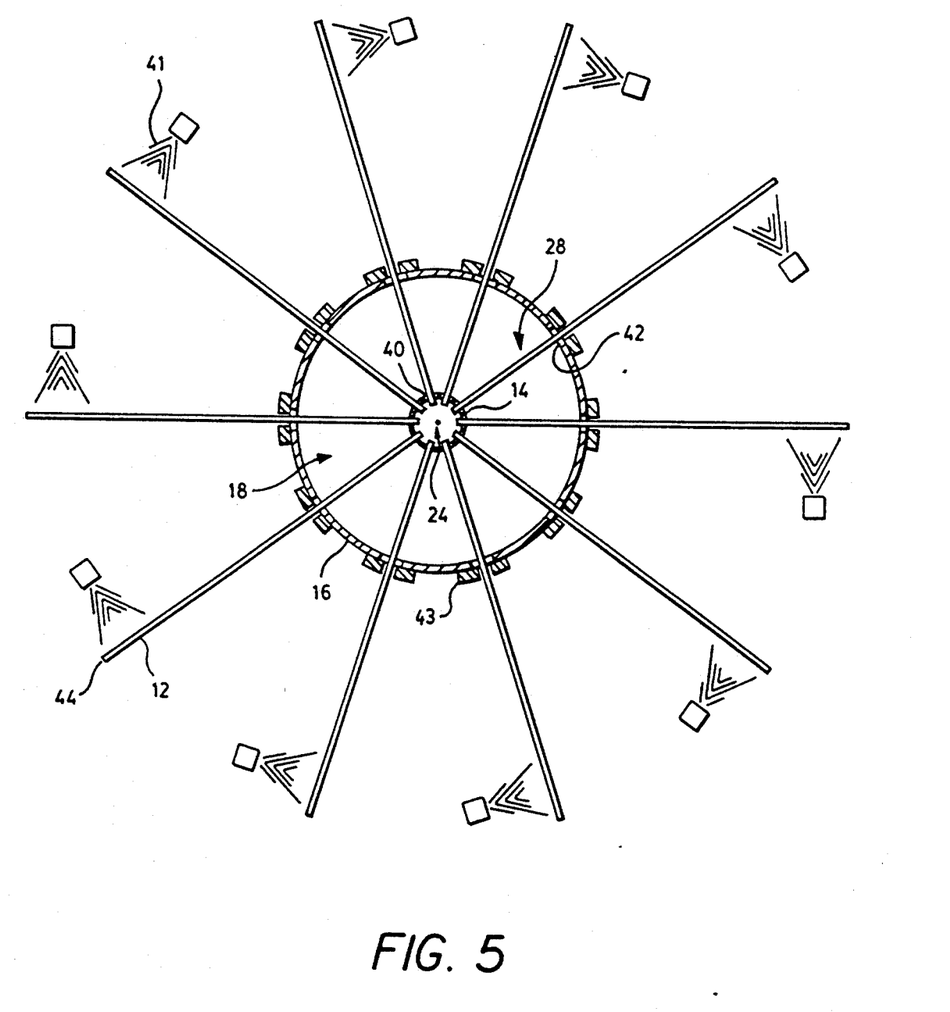
FIG. 5 is a plan view transverse to the inner and outer guides of the apparatus with ten blades.

As shown in FIG. 2, eight blades 12 are spaced circumferentially about the guides' longitudinal axis 24, as shown in FIG. 1. Alternatively, as shown in FIG. 5, ten blades 12 may be spaced circumferentially about the guide's longitudinal axis 24. The blades 12 are spaced equally from each other such that the sections of fruit cut are generally of equal size and shape. Preferably, each blade 12 is made from stainless steel or other material known in the art for cutting fruit. The blade 12 may be 7 inches in diameter and 0.058 inches thick. The cutting edge 44 for each blade 12 is serrated or slotted (e.g., 120 slots per blade) and a small radius may be provided at the intersection of each slot and the blade cutting edge 44.

A portion 28 of each blade 12 passes through an outer guide aperture 42, through the annular opening 18 and into a corresponding inner guide aperture 40. As illustrated in FIG. 2, the inner and outer guides 14,16 are arranged such that the outer guide apertures 42 are aligned with the inner guide apertures 40. In this way, each blade 12 can rotatably extend into and through the annular opening 18.

As fruit falls in the annular opening 18, as described above, the fruit contacts the cutting edge 44 of the rotating blade portion 28 in the annular opening. When the fruit contacts the rotating cutting edge 44, the fruit is cut by that portion 28 of the blade in the annular opening. In this way, a cored piece of fruit whether whole or broken can be cut into the desired shape or section.

As indicated above, the inner guide 14 may be a solid rod. In this case, grooves may be cut in the inner guide outer surface 26 corresponding to the angular pattern for the blades 12. Alternatively, the blades 12 may be positioned such that the blade cutting edge 44 is proximate the inner guide outer surface 26. When the cutting edge 44 is proximally located, the edge must be positioned such that the fruit is still sectioned by the blade as it rotates.

The outer and inner guide apertures 40,42 are sized to allow each blade 12 to rotate through the apertures without contacting the guides 14,16. The outer guide aperture 42 is also sized to prevent or minimize entry of foreign matter into the annular opening 18. The inner guide aperture 42, should be similarly sized to prevent the entry of foreign matter. Alternatively, the outer guide may include a barrier 45 for each outer guide aperture 42 to effectively reduce the size of the aperture opening to avoid contamination of the fruit being cut. Besides sizing the guides' apertures 40,42, there are also several techniques for cleaning rotating surfaces. For example, water 41 may be sprayed on the flat surface of a rotating blade 12.

Figure 3:
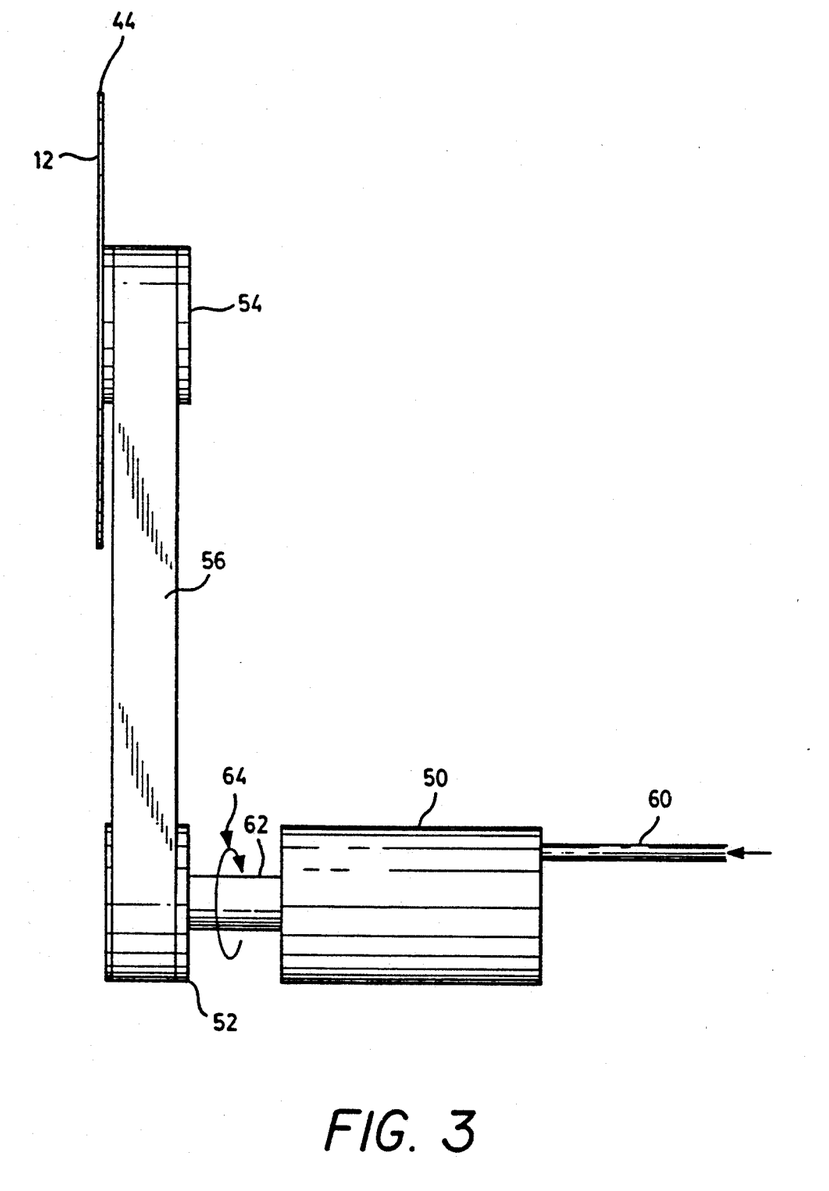
FIG. 3 is plan view of a single blade and the associated drive motor means.

There is shown in FIG. 3, a drive means 20 that rotatably drives a single blade 12. The drive means 20 includes an air driven motor 50 that is powered by compressed air supplied to the motor over an air line 60. Alternatively, the drive means 20 may include a hydraulic motor. The hydraulic motor may be rotatably interconnected to the blade 12 as described below or it may be interconnected directly to the blade 12 using any of a number of means known in the art.

The air driven motor 50 is rotatably connected to a first pulley 52 by a shaft 62. The first pulley 52 rotates in a predetermined direction 64 as the motor rotates in response to the flowing compressed air. Affixed to the blade 12 is a second pulley 54. The first pulley 52 and the second pulley 54 are rotatably interconnected by a drive belt 56. In this way, the air driven motor's rotation results in the rotation of the blade.

Using techniques well known in the art, one can arrive at a pulley and belt combination, including the pulley sizes, which will cause the blade 12 to rotate at the speed required to cut through the fruit. In a preferred embodiment, the pulleys 52,54 and the drive belt 56 are toothed to provide a positive engagement between the belt and pulleys. Positive engagement can limit slippage between the belt and pulleys that can occur if the belt/pulley interface becomes wet.

While an air driven or hydraulic motor is described, the motor may be any motor known in the art. However, the motor selected should also minimize the potential harm to an operator (e.g., electric shock). It should also be recognized that minimizing the number of parts of the drive means further reduces the potential sources of foreign matter that can contaminate the fruit as it is being cut.

A fragmentary elevation view of the fruit sectioning machine 10 of the present invention is shown in FIG. 4. In this illustration, as with FIG. 1, some machine components (e.g., the drive means 20) have been broken away for clarity. To cut a whole piece of cored and peeled fruit, the fruit 70 is positioned such that the inner guide 14 is disposed within the fruit core hole 72. After the fruit is released, the piece of fruit 70 falls in a downward direction 74 due to gravity. The falling fruit 70 is guided to the rotating blades 76 by the cooperation, of the inner guide outer surface 26 and the core hole 72.

If the piece of fruit 70 is broken into a plurality of segments, the inner guide outer surface 26 and the outer guide inner surface 22 cooperate to retain the orientation of the fruit 70 as it falls. In this way, broken fruit can be cut into wedges or the desired shape.

The fruit is cut into wedges (i.e., sections) by the blade portions 28 that extend through the outer guide blade apertures 42 and through the annular opening 18. The blade portions 28 extend into the hollow inner guide by means of the corresponding inner guide blade apertures 40. Each blade potion 28 extending into the inner guide 14 assures that the fruit 70 is cut from the fruit's outer surface 78 to the core hole 72.

While a preferred embodiment of the invention has been described using specific terms, such description is for illustrative purposes only, and it is to be understood that changes and variations may be made without departing from the spirit or scope of the following claims.

What is claimed is:

1. An apparatus for cutting fruit into a desired shape, comprising:
   a plurality of blades;
   an inner guide having a longitudinal axis and an outer surface, said inner guide having a plurality of longitudinally extending apertures equal in number to said plurality of blades, each of the longitudinally extending apertures being disposed in the inner guide outer surface and being circumferentially spaced from each other;
   an outer guide having a longitudinal axis and inner and outer surfaces, said outer guide having a plurality of longitudinally extending apertures equal in number to said plurality of blades, each of the longitudinally extending apertures being disposed in the outer guide outer surface and being circumferentially spaced from each other such that the outer guide apertures are aligned with the inner guide apertures;
   wherein said inner guide is spaced from the outer guide inner surface to form a longitudinally extending annular aperture between the inner guide outer surface and the outer guide inner surface;
   wherein each of said blades is disposed such portion of each said blade extends through an aperture in said outer guide and into the annular aperture; and
   a plurality of blade drive means for rotating each of said blades such that the fruit contacting the rotating blades is cut into the desired shape.

2. The apparatus for cutting fruit of claim 1, wherein the inner guide outer surface and the outer guide inner surface cooperate to maintain the fruit in the desired orientation and to guide the fruit to said blades, rotated by said blade drive means, so the fruit can be cut into the desired shape.

3. The apparatus for cutting fruit of claim 2, in which said outer guide further includes means for forming a barrier between the annular aperture and said blade drive means to avoid contamination of the fruit being cut.

4. The apparatus for cutting fruit of claim 3, further comprising frame means for securing and positionally aligning said inner and outer guides, said blades and said blade drive means such that the fruit can be cut into the desired shape.

5. The apparatus for cutting fruit of claim 2, in which said portion of each said blade, extending through an outer guide aperture, further comprises extending through the annular aperture and into a corresponding inner guide aperture.

6. The apparatus for cutting fruit of claim 5, wherein said inner and outer guides are hollow right circular cylinders and in which the longitudinal axis of both said cylinders are disposed in common.

7. The apparatus for cutting fruit of claim 6, wherein the outer guide apertures and the corresponding inner guide apertures are aligned along radii from the common longitudinal axis.

8. The apparatus for cutting fruit of claim 6, wherein the fruit is cored before cutting and in which the maximum diameter of said inner guide is less than the diameter of the core cavity in the fruit.

9. The apparatus for cutting fruit of claim 8, in which the diameter of the outer guide inner surface is optimally spaced from the outer surface of the inner guide based on the size of the fruit to be cut.

10. The apparatus for cutting fruit of claim 9, further including means for adapting said outer guide to cut fruit of different sizes.

11. The apparatus for cutting fruit of claim 2, in which each said drive means further includes an air driven motor means for rotatably driving each of said blades.

12. The apparatus for cutting fruit of claim 11, in which each said drive means includes a belt drive means for rotatably interconnecting each said blade and each said air driven motor means such that rotation of said air driven motor means causes each said blade to rotate at a predetermined speed.

13. The apparatus for cutting fruit of claim 12, in which said belt drive means for each said drive means further includes a drive belt and first and second pulley means, said first pulley means being secured to a blade and said second pulley means being secured to an air driven motor means, wherein said drive belt rotatably interconnects said first and second pulley means.

14. The apparatus for cutting fruit of claim 2, in which each said drive means further includes a hydraulic motor means for rotatably driving each of said blades.

15. The apparatus for cutting fruit of claim 11, wherein there are eight blades for cutting.

16. The apparatus for cutting fruit of claim 11, wherein there are ten blades for cutting.

17. The apparatus for cutting fruit of claim 4, further comprising means for transferring cut fruit for further processing and in which said outer guide further includes means for directing cut fruit from the rotating blades to said transferring means.

18. The apparatus for cutting fruit of claim 17, further including means for cleaning each of said blades while rotating.

19. An apparatus for cutting fruit into a desired shape, comprising:
   a plurality of blades;
   an inner guide having a longitudinal axis and an outer surface, said inner guide having a plurality of longitudinally extending apertures equal in number to said plurality of blades, each of the longitudinally extending apertures being disposed in the inner guide outer surface and being circumferentially spaced from each other;
   an outer guide having a longitudinal axis and inner and outer surfaces, said outer guide having a plurality of longitudinally extending apertures equal in number to said plurality of blades, each of the longitudinally extending apertures being disposed in the outer guide outer surface and being circumferentially spaced from each other such that the outer guide apertures are aligned with the inner guide apertures, said outer guide further including means for forming a barrier between the annular aperture and said blade drive means to avoid contamination of the fruit being cut;

wherein said inner guide is spaced from the outer guide inner surface to form a longitudinally extending annular aperture between the inner guide outer surface and the outer guide inner surface;

wherein the inner guide outer surface and the outer guide inner surface cooperate to maintain the fruit in the desired orientation and to guide the fruit to said blades, rotated by said blade drive means, so the fruit can be cut into the desired shape;

wherein each of said blades is disposed such that a portion of each said blade extends through an aperture in said outer guide, extends through the annular aperture and extends into a corresponding inner guide aperture; and a plurality of blade drive means for rotating each of said blades such that the fruit contacting the rotating blades is cut into the desired shape, said blade drive means further including motor means for rotatably driving each of said blades and belt drive means for rotatably interconnecting each said blade and each said motor means such that rotation of said motor means causes each said blade to rotate at a predetermined speed.

20. The apparatus for cutting fruit of claim 19, wherein said inner and outer guides are hollow right circular cylinders and in which the longitudinal axis of both said cylinders are disposed in common.

21. The apparatus for cutting fruit of claim 20, wherein the fruit is cored before cutting and in which the maximum diameter of said inner guide is less than the diameter of the core cavity in the fruit.

22. The apparatus for cutting fruit of claim 21, in which the diameter of the outer guide inner surface is optimally spaced from the outer surface of the inner guide based on the size of the fruit to be cut.

23. The apparatus for cutting fruit of claim 22, further including means for adapting said outer guide to cut fruit of different sizes.

24. The apparatus for cutting fruit of claim 23, in which said belt drive means further includes a drive belt and first and second pulley means, said first pulley means being secured to each said blade and said second pulley means being secured to each said motor means, wherein said drive belt rotatably interconnects said first and second pulley means.

25. The apparatus for cutting fruit of claim 24, wherein each said motor means further includes an air driven motor.

* * * * *

UNITED STATES PATENT AND TRADEMARK OFFICE
CERTIFICATE OF CORRECTION

PATENT NO. : 5,241,902
DATED : September 7, 1993
INVENTOR(S) : Joseph C. Gangi

It is certified that error appears in the above-identified patent and that said Letters Patent is hereby corrected as shown below:

Column 7, line 44 (i.e., claim 1, line 24) between "such" and "portion" insert -- that a --.

Signed and Sealed this

Twenty-second Day of March, 1994

BRUCE LEHMAN

Attest:

Attesting Officer

Commissioner of Patents and Trademarks